United States Patent

Rohrbaugh

[11] Patent Number: 5,944,317
[45] Date of Patent: Aug. 31, 1999

[54] SHOCK WAVE SCORING APPARATUS EMPLOYING DUAL CONCENTRIC CURVED ROD SENSORS

[76] Inventor: George Wilson Rohrbaugh, RD#1, 454, Alexandria, Pa. 16611

[21] Appl. No.: 08/888,416

[22] Filed: Jul. 7, 1997

[51] Int. Cl.[6] .................................................... G01S 3/80
[52] U.S. Cl. ......................... 273/372; 273/371; 367/127; 367/129; 367/906; 235/400
[58] Field of Search ................... 273/371, 372; 367/127, 129, 140, 153, 906; 463/52, 53; 235/400, 411, 417; 340/500, 546; 73/1.75, 12.07; 473/150–156

[56] References Cited

U.S. PATENT DOCUMENTS

| | | | |
|---|---|---|---|
| 2,916,289 | 12/1959 | Zito | 273/372 |
| 2,925,582 | 2/1960 | Mattei et al. | 273/372 |
| 2,934,346 | 4/1960 | Mongello | 273/372 |
| 2,973,964 | 3/1961 | Zito | 273/372 |
| 3,022,076 | 2/1962 | Zito | 273/372 |
| 3,217,290 | 11/1965 | Sellman | 273/372 |
| 3,392,979 | 7/1968 | Wilska | 273/372 |
| 3,479,032 | 11/1969 | Ohlund et al. | 273/372 |
| 3,778,059 | 12/1973 | Rohrbaugh et al. | 273/372 |
| 4,261,579 | 4/1981 | Bowyer et al. | 273/372 |
| 4,350,881 | 9/1982 | Knight et al. | 235/400 |
| 4,351,026 | 9/1982 | Phillips | 364/423 |
| 4,514,621 | 4/1985 | Knight et al. | 235/400 |
| 5,025,424 | 6/1991 | Rohrbaugh | 367/127 |
| 5,363,341 | 11/1994 | Schwald et al. | 367/140 |
| 5,447,315 | 9/1995 | Perkins | 273/371 |
| 5,846,139 | 12/1998 | Bair et al. | 473/156 |

OTHER PUBLICATIONS

TG–2000/2001 Electronic Hit Scoring System, Polytronic, Feb. 1984.

*Primary Examiner*—Michael O'Neill
*Assistant Examiner*—John M. Hotaliag, II

[57] ABSTRACT

This invention is an automatic gunnery system, responsive to airborne acoustic shock waves produced by a projectile passing through a target area. The invention relates specifically to the "hit" location of the said projectile for the condition when the flight path of the projectile is not perpendicular to the target area. Two pairs of concentric curved elongated acoustic energy conductors (curved sensor rods) are located adjacent to one side of said target area with acoustic transducers attached to the end portions thereof. Said transducers produce an electrical signal when a shock wave from the projectile reaches them through said energy conductors. Electrical signals from the transducers are connected to electronic circuitry and a calculating computer which calculates the intersection of two circles and determines the location of each "hit" on or near the target with each "hit" registered on a graphical display means.

5 Claims, 2 Drawing Sheets

SHOCK WAVE SCORING APPARATUS EMPLOYING DUAL CONCENTRIC CURVED ROD SENSORS

The present application is an improvement on the inventions in U.S. Pat. Nos. 3,778,059 and 5,025,424 by the present inventor and on U.S. Pat. No. 40351,026 by Phillips.

BACKGROUND OF THE INVENTION

1. Field of the Invention

This invention relates to automatic shock wave scoring apparatus for scoring the "hit" of a supersonic projectile in a target area where the "hit" is determined from the detection of the acoustic ballistic shock wave. More particularly, this invention relates to the location and configuration of concentric curved acoustic energy conductors (rod sensors) for detecting the ballistic shock wave where the rod sensors form a part of such automatic target scoring apparatus. This invention uses concentric curved acoustic energy conductors to replace the mutually perpendicular linear acoustic energy conductors in the Rohrbaugh U.S. Pat. No. 3,778,059 and replaces the single curved energy conductor in U.S. Pat. Nos. 5,025,424 and 4,351,026 with a pair of concentric curved acoustic conductors which are located only on one side of the target area. Mathematically calculated circles which pass through the score points on the rod sensors and the center of curvature of two pairs of concentric curved acoustic energy conductors intersect in the target area and locate a "hit" when an "off-axis" projectile having a flight path which is not perpendicular to the plane of the target area passes through the target area.

2. Discussion of Prior Art

Two basic methods are employed for determining the "hit" location of a supersonic projectile using the acoustic shock wave generated by the passing projectile which must be fired substantially perpendicular to the plane of the target scoring area. The first employs point sensors arrayed around or near the target area and calculates the projectile's location based on the arrival times of the shock wave at the various sensors. The time of arrival of the ballistic shock wave at each sensor, the locations of the sensors, the speed of sound in air, and the velocity of the projectile are used to make the calculation of the "hit" coordinates. The flight path of the projectile must be substantially perpendicular to the target plane for the "hit" to be determined accurately. Examples of this method of scoring supersonic projectiles are disclosed in U.S. Pat. No. 2,925,582 (Mattei) and U.S. Pat. No. 4,261,579 (Bowyer).

The second method employs petal rod sensors either linear or curved to detect the ballistic shock wave. Linear rod sensors are placed on the sides of the target area as disclosed in U.S. Pat. No. 3,778,059 (Rohrbaugh). The rod sensors replace the point sensors of the first method and determine the projectile's location based on the arrival times of the metal borne shock waves at transducers on the ends of the rod sensors. Only the speed of sound in the metal rods and the time of arrival of the metal borne shock waves at the transducers are needed to determine the "hit" coordinates. As is the case for the point sensor system above, the flight path of the projectile must be substantially perpendicular to the target plane for the "hit" to be determined accurately by the rod sensors.

Since this new invention relates to the improvement of the scoring apparatus which uses rod sensors to score "off-axis" (non perpendicular) projectile flight paths with respect to the target scoring plane, the following is an in-depth discussion of current target scoring which uses the metallic rod sensors.

The automatic gunnery system described in the Rohrbaugh U.S. Pat. No. 3,778,059 detects the ballistic shock wave generated by a supersonic projectile with linear metallic acoustic rod sensors. The rod sensors, one vertical and one horizontal, are located on the perimeter of the target area to be defined. The two rod sensors are mutually perpendicular and describe an XY-coordinate grid within the target area. The ballistic shock wave from a supersonic projectile passing through the grid area impinges on the metallic rod sensors causing secondary acoustic shock waves to be generated in the metallic rods. The secondary shock waves in each rod move away from the impact tangent point where the airborne ballistic shock wave first intercepted the metallic sensor rod and travel in opposite directions toward the ends of the rod. Transducers located on the ends of the rod detect the shock waves in the metal rod and produce electrical signals which start and stop timing circuits. The relative time difference of the start and stop signals from the opposite ends of the rod sensor, coupled with the known velocity of sound in the metallic rod, allows calculation of the impact point on the linear rod. Each rod sensor, one vertical and one horizontal, acts independently of the other to produce one axis of the XY-coordinate grid which defines the target area. The intercept of the XY-coordinates defines the "hit" for a projectile which passes through that intercept point. The resulting "hit" data are displayed as digital numbers representing the distance from the target center or displayed in graphic form as a dot on a display screen.

Curved rod sensors as described in U.S. Pat. Nos. 5,025,424 and 4,351,026 function in a like manner to the linear rod sensors but define the XY-coordinates of a "hit" as the intersection of two radial lines, where each radial line passes through the center of curvature and the tangent score point of a curved rod sensor. At least two curved rod sensors are placed on the same side of the target area to produce radial lines which intersect in the target area and define the "hit" coordinates. Both curved rods are placed below the line of fire and away from possible impact damage.

A serious limitation of both the linear rod system and the curved rod system is the requirement that the flight path of the projectile be substantially perpendicular to the target plane for accurate determination of the "hit" coordinates. The large errors introduced when "off-axis" projectiles are scored using an acoustic shock wave system can be mathematically determined and the errors corrected provided the impact velocity and flight path angle of the projectile are known in advance, which is not normally the case for typical shooting range applications, especially if either the target or shooter is moving.

A limitation of the linear rod sensor system described in the Rohrbaugh invention, U.S. Pat. No. 3,778,059, is the necessity for the vertical rod sensor to define one axis of the scoring grid in the target area. The vertical rod sensor is visible to the shooter which makes camouflage of the target area very difficult when the target scoring system is employed for training with pop-up type targets. Also, the vertical rod sensor is in the line of fire and can be damaged unless protected by armor plate. Such armor plate is unacceptable in most applications because of the weight and safety considerations from ricocheting bullets.

PRIOR ART STATEMENT

The following patents are hereby referenced as being typical of the known prior art:

U.S. Pat. No. 2,916,289, December 1959, Zito
U.S. Pat. No. 2,925,582, February 1960, Mattei U.S. Pat. No. 2,934,346, April 1960, Mongello
U.S. Pat. No. 2,973,964, March 1961, Zito
U.S. Pat. No. 3,022,076, February 1962, Zito
U.S. Pat. No. 3,217,290, November 1965, Sellman
U.S. Pat. No. 3,392,979, July 1968, Wilska
U.S. Pat. No. 3,479,032, 1969, Ohlund
U.S. Pat. No. 3,778,059, December 1973, Rohrbaugh
U.S. Pat. No. 4,261,579, April 1981, Bowyer
U.S. Pat. No. 4,351,026, September 1982, Phillips
U.S. Pat. No. 5,025,424, June 1991, Rohrbaugh

SUMMARY OF THE INVENTION

The main object of this invention is to provide an acoustic target scoring system based on a new rod sensor configuration which can accurately score any supersonic projectile even when the projectile's flight path is not perpendicular to the target scoring plane defined by the rod sensors.

Another object of the invention is to use co-planer pairs of concentric curved rod sensors to define a scoring area based on the intercept of two circles where each circle is mathematically defined by three points; namely, the center of curvature of a pair of concentric curved rods and the tangent impact points (acoustic score points) on the rods in the paired set.

Another object of the invention is to define the scoring "hit" point as the intersection of two parabolas, instead of the two circles described in the above paragraph, where each parabola is mathematically defined by the same above mentioned three points used to calculate the circular equations (center of curvature and the tangent impact points on the rods).

DESCRIPTION OF THE PREFERRED EMBODIMENT

The proposed invention is based on the principle that a projectile or bullet exceeding the speed of sound in air creates an acoustic shock wave which expands away from the line of flight of the bullet. As the bullet moves, the airborne shock wave appears as an expanding cone of high-energy acoustic activity which can be detected by piezoelectric transducer devices which operate to produce an electrical signal when struck by the acoustic shock wave. By placing the transducers on the ends of metal rods, and arranging the rod sensors around a target scoring area, the location of the supersonic projectile can be calculated by measuring the time of arrival of the metal borne shock wave at the ends of the rods. The metal rod sensors of the proposed invention are curved and placed on one side of a target area to produce overlapping fan-shaped detection grids.

When the flight path of the projectile is perpendicular to the target plane the intersection of the shock wave cone and the target plane produces an expanding circle in the plane of the target. This expanding circle strikes the curved rod sensor at a tangent point which lies on a straight line which passes through the center of curvature and the "hit" point in the target plane. For all other conditions when the flight path of the projectile is NOT perpendicular to the target plane the intersection of the plane and cone produces a conic section, normally an ellipse.

The expanding ellipse from an "off-axis" projectile strikes any curved rod sensor at a tangent point which lies on a circle (not a straight line as above) which passes through the center of curvature and the "hit" point in the target plane. However, unlike the straight line which only requires two data points for definition, a third data point is required to define the equation of the circle (or parabola). A second curved rod sensor is required to produce a second tangent score point produced by the expanding ellipse in the target plane. The second rod sensor, which must be concentric with the first rod sensor, yields the required third point necessary to define the circle on which the "hit" lies. The intersection of two such circles defines the XY-coordinates of the "hit" in the target plane.

Figure 1:
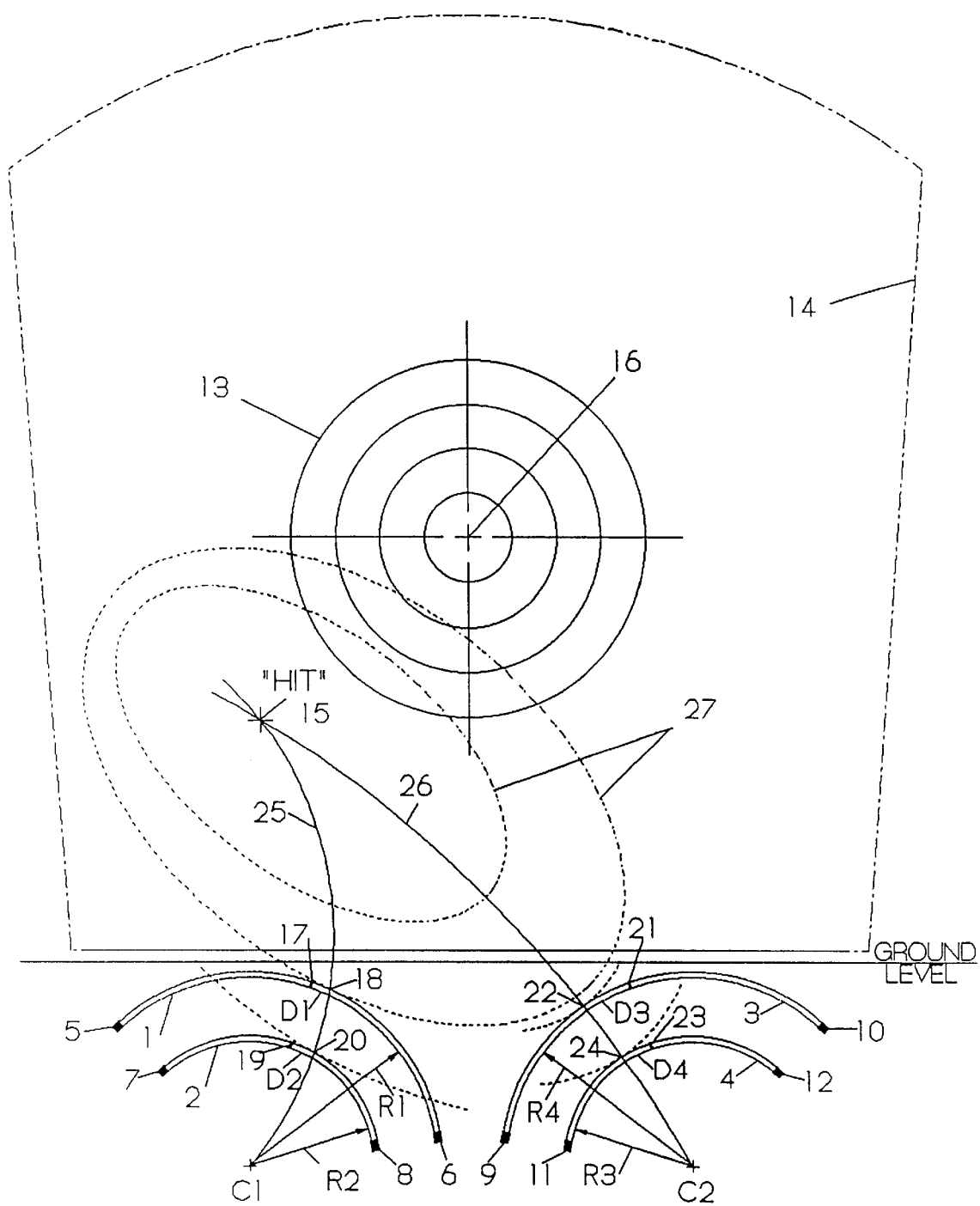
FIG. 1 is a drawing showing a front view of the preferred embodiment of the invention where two pairs or concentric curved rod sensors are placed below the target scoring region. Circles through the score points on the four rod sensors are shown intersecting in the target scoring plane at the "hit" location for a projectile fired "off-axis" from below-and to the right of the target.

Direct your attention to the preferred embodiment of the invention as shown in FIG. 1. Two pairs of co-planer concentric curved rod sensors 1&2 (left) and 3&4 (right) are arranged in a plane below the target scoring region 14 and intercept the acoustic shock wave 27 from a projectile passing through the "hit" point 15.

Rod sensors 1,2,3 and 4 are circular in shape (arc of a circle). The rod sensors may be made of materials such as aluminum, iron, steel, brass, etc. The rod sensors may be constructed of nonmetallic acoustic transmitting materials such as glass, ceramic, and the like.

An aiming target 13 with target center 16 is located in the scoring region 14 and referenced to the scoring grid of the curved rods. The left rod sensor 1 forms an arc of a circle having a center C1 and a radius of curvature R1. The left rod sensor 2 forms an arc of a circle having a center C1 but a smaller radius of curvature R2. The right rod sensor 3 forms an arc of a circle having a center C2 and a radius of curvature R3. The right rod sensor 4 forms an arc of a circle having a center C2 and a radius of curvature R4. The metallic rod sensors 1,2,3 and 4 each have piezoelectric transducers on both ends. Transducers 5 and 6 are attached to the left rod sensor 1 and transducers 7 and 8 are attached to the left rod sensor 2. Transducers 9 and 10 are attached to the right rod sensor 3 and transducers 11 and 12 are attached to the right rod sensor 4. The length of the rod sensor arc, the radius of curvature of the arc, and the distance between the arc centers C1 and C2 are physical parameters chosen to define the size and position of the target scoring region 14. These same parameters are used in the calculation of the circular equations which pass through the arc centers, the tangent scoring points on the rod sensors at 18,20,22 and 24, and the "hit" point 15.

In operation, the expanding acoustic shock wave 27 from a passing projectile appears as a series of expanding ellipses (or circles for the special case when the projectile's flight path is perpendicular to the target plane) in the plane of the target with the center of expansion at the bullet's "hit" point 15. The expanding shock wave first strikes rod sensor 1 at a tangent point 18 and a short time later intercepts rod sensor 2 at tangent point 20. The secondary acoustic shock waves in the metal rod sensor 1 travel away from the tangent point 18 toward the rod ends at the speed of sound in the metal and excite transducers 5 and 6. Transducer 6 is closer to the impact tangent point 1a and is the first to produce an electrical signal which is used to start an electronic scoring circuit 28 shown in FIG. 2. When transducer 5 is excited by the metal borne shock wave in rod sensor 1 the electrical signal is used to stop the left rod 1 scoring circuit 28. The distance D1 from the tangent point 18 to the rod midpoint 17 is calculated using the simple equation $$D1=(T5-T6)(V1)/2$$

where T5-T6 is the time difference between the start and stop timing signals from left rod sensor 1 and V1 is the velocity of sound in the left rod sensor 1.

In a similar manner, the secondary acoustic shock waves in the metal rod sensor 2 travel away from the tangent point 20 toward the rod ends at the speed of sound in the metal and excite transducers 7 and 8. Transducer 8 is closer to the impact tangent point 20 and is the first to produce an electrical signal which is used to start an electronic scoring circuit 29 shown in FIG. 2. When transducer 7 is excited by the metal borne shock wave in rod sensor 2 the electrical signal is used to stop the left rod 2 scoring circuit 29. The distance D2 from the tangent point 20 to the rod midpoint 19 is calculated using the simple equation $$D2=(T7-T8)(V2)/2$$

where T7-T8 is the time difference between the start and stop timing signals from left rod sensor 2 and V2 is the velocity of sound in the left rod sensor 2. The score values D1 and D2 for the left pair of concentric rod sensors and the arc center C1 define a circle 25 which passes through the "hit" point 15 and forms one grid line in the target scoring region 14.

The right pair of concentric curved rod sensors 3 and 4 have an arc center C2 and score in a similar manner to the pair of left rod sensors described above. The tangent score points 22 and 24 produce rod scores D3 and D4. Circle 26 is defined (three points) by the score points D3 and D4 and the center of curvature at arc center C2 and is the second circular grid line which passes through the "hit" point 15. The XY-coordinates of the "hit" 15 are thus defined by the intercept of the two circles 25 and 26.

Figure 2:
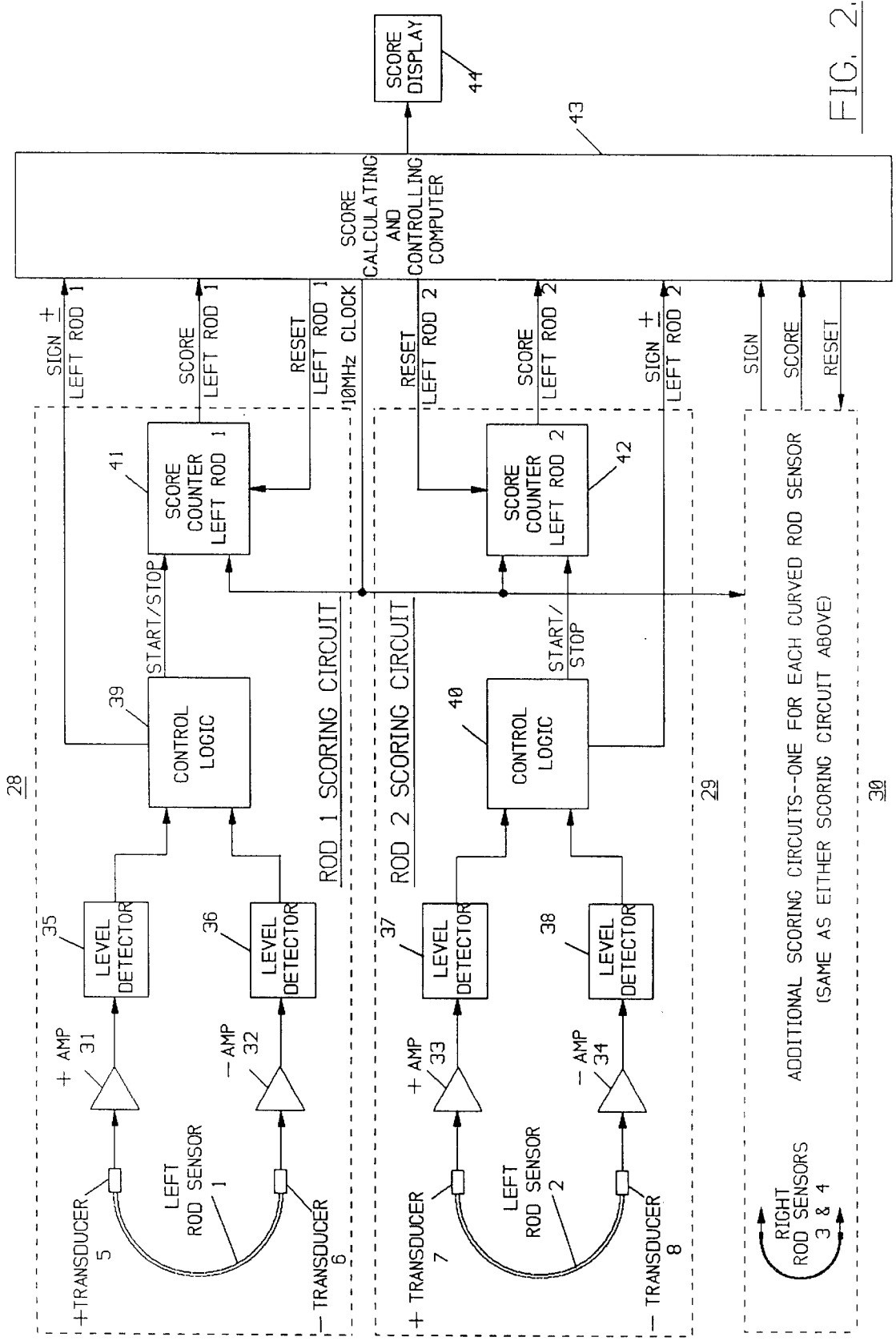
FIG. 2 shows a block diagram of the electronic circuitry required for the automatic target scoring apparatus of the preferred embodiment.

FIG. 2 shows the electronic circuitry in block form for the preferred embodiment of the curved rod sensor target scoring apparatus. The left rod sensor 1 with transducers 5 and 6 along with a mating concentric left rod sensor 2 with transducers 7 and 8 are shown coupled to the electronic scoring circuitry 28 and 29 respectively. The plus (+) transducer 5 of the left rod 1 is electrically connected to amplifier 31 where the electrical analog signal produced by the transducer 5 when struck by the acoustic shock wave 27 is amplified and filtered before passing to the level detector 35. In like manner the minus (−) transducer 6 of the left rod 1 is connected to the amplifier 32 which is connected to level detector 36.

The level detectors 35 and 36 produce digital electrical pulses when the analog signal inputs reach the detection threshold level. The outputs from the level detectors 35 and 36 are fed into control logic circuitry 39 which determines the sign (+/−) of the left rod 1 score and produces the start/stop gate signal for the left rod 1 score counter 41. The start/stop signal gates a 10 MHz clock signal from the computer 43 to the left rod 1 score counter 41 where the digital score is accumulated. The left rod 1 score value with sign (+ or −) is coupled to the score calculating and controlling computer 43. The computer calculates the distance along the left rod sensor 1 from the midpoint using the time accumulated in the score counter 41 and the velocity of sound for the metal type used to fabricate the left rod sensor 1, e.g., aluminum. The direction from the midpoint is determined by the sign from the control logic 39. The controlling computer 43 resets the score counter 41 in preparation for the next shot after transferring the count to the memory of computer 43.

The left rod sensor 2 and associated scoring circuitry 29 operate independently of the left rod sensor 1 and left rod 1 scoring circuitry 28. The plus (+) transducer 7 is connected to the amplifier 33 and the minus (−) transducer 8 is connected to amplifier 34. As with the left rod 1 scoring circuitry 28, the amplified signals are amplitude detected by connected level detectors 37 and 38 to produce digital pulses which control the logic circuitry at 40. The control logic 40 generates the sign of the score and produces the start/stop gate for the connected left rod 2 score counter 42. The start/stop signal gates the 10 MHz clock pulses from the computer 43 to the left rod 2 score counter 42 where the digital score is accumulated. The left rod 2 score value with sign (+ or −) is coupled to the score calculating and controlling computer 43 where the left rod 2 score is calculated. A reset for the left rod 2 score counter 42 is generated by the computer at the completion of the rod scoring cycle. When both left rod scores have been transferred to the computer 43, the computer calculates the equation for a circle 25 which passes through the three points defined by the left rod 1 score, the left rod 2 score, and the arc center C1 for the two concentric left rods.

The additional scoring circuitry 30 for the two concentric right sensor rods 3 and 4 is similar to the scoring circuitry 28 and 29 described above for the left rod sensors 1 and 2. And, as was the case for the left rod sensors, when both right rod scores have been transferred to the computer 43, the computer calculates the equation for a circle 26 which passes through the three points defined by the right rod 3 score, the right rod 4 score, and the arc center C2 for the two concentric right rods. The computer 43 then determines the XY-coordinates for the impact point ("hit") 15 by solving for the intercept of the two equations for circles 25 and 26. Finally, the computer 43 outputs the XY-coordinates to a display device 44, such as a printer or electronic graphic display screen.

The score produced by a curved rod sensor is relative to the center point of the rod and is independent of rod length. Sensor rods of any length may be employed depending on the scoring requirements and size of the desired scoring region. In a similar manner, the radius of curvature of the rod sensor may vary depending on the size of scoring region and the desired scoring accuracy. The accuracy is a function of the rod radius and rod placement because the highest scoring accuracy is achieved when the circles of the scoring grid intersect as nearly perpendicular as possible at the "hit" point in the scoring region.

I claim:

1. An automatic target scoring apparatus responsive to the airborne acoustic shock wave of a supersonic projectile for determining the "hit" location at which the projectile passed through a predetermined target area when the trajectory of the projectile is not perpendicular to the target scoring plane of the said scoring apparatus, comprising, in combination:

two pairs of concentric elongated curved acoustic energy translation rods located adjacent to the said target area and being substantially in the same plane defined by the target area and in a predetermined relationship to said target area to intercept the outwardly expanding airborne first acoustic shock wave of said projectile wherein said curved acoustic energy translation rods transmit relatively higher velocity secondary acoustic shock waves therein from the tangent point of contact with the first acoustic airborne shock wave;

eight acoustic transducers mounted one on each end portion of each of the said two pairs of curved acoustic energy translation rods, being respectively responsive to the said secondary acoustic shock wave in the said rod to produce an electrical output signal upon the incidence thereof, said electrical output signals of each pair of said transducers on each of the four said curved acoustic energy translation rods having a timed relationship which is a function of the difference in the arrival times of the said secondary acoustic shock wave at the said respective acoustic transducers;

independent electrical circuit means coupled to each of the said eight acoustic transducers responsive to said electrical signals produced thereby for providing an output signal which is a measure of the difference of the arrival time of said secondary acoustic shock wave respectively at each transducer of said pair of transducers on each of the four said curved acoustic energy translation rods;

computer means coupled to each electrical circuit means wherein the position of the said supersonic projectile passing through the said target area is calculated as the intercept of two circles where the first circle is defined as passing through three points where the first point is the tangent point of contact between the said airborne first acoustic shock wave and the first rod of a first pair of said concentric curved acoustic energy translation rods and where the second point is the tangent point of contact between the said airborne first acoustic shock wave and the second rod of the said first pair of concentric curved acoustic energy translation rods and where the third point is the center of curvature of the said first pair of concentric curved acoustic energy translation rods, and where the second circle is defined as passing through three additional points where the first point is the tangent point of contact between the said airborne first acoustic shock wave and the first rod of a second pair of said concentric curved acoustic energy translation rods and where the second point is the tangent point of contact between the said airborne first acoustic shock wave and the second rod of the said second pair of concentric curved acoustic energy translation rods and where the third point is the center of curvature of the said second pair of concentric curved acoustic energy translation rods;

a display means connected to said computer means for representing the "hit" position determined by the said computer in numeric XY-coordinates or as a graphic relationship to the said target area.

2. The combination as claimed in claim 1, in which the independent electrical circuit means is comprised of, in combination:

a level amplifier means connected to each of said eight transducers;

a level detector means connected to each of said level amplifiers;

a control logic circuit connected to said level detector means;

a score counter connected to said control logic circuit and to said computer means.

3. The combination as claimed in claim 1 wherein the position of the said supersonic projectile passing through the said target area is calculated as the intercept of two parabolas.

4. An automatic target scoring apparatus as claimed in claim 1 wherein the two pairs of concentric curved acoustic energy translation rods are positioned on one side of the target area and produce two computer calculated intersecting circles which pass through the "hit" point in the said target area, where each said circle passes through one of the centers of curvature of the said pairs of curved rods and passes through the respective tangent points of contact between the primary acoustic shock wave and the respective said pair of concentric curved acoustic energy translation rods.

5. An automatic target scoring apparatus as claimed in claim 4 wherein computer calculated intersecting parabolas pass through the "hit" point in the said target area.

* * * * *